United States Patent Office 2,874,147
Patented Feb. 17, 1959

---

2,874,147

PRODUCTION OF PHENOLIC RESINS FROM ALKYL BENZENE HYDROPEROXIDES

Heinrich Hock, Clausthal-Zellerfeld, Germany, assignor to Ruhrchemie Aktiengesellschaft, Oberhausen-Holten, Germany No Drawing. Application November 24, 1954
Serial No. 471,100

Claims priority, application Germany December 3, 1953

2 Claims. (Cl. 260—57)

This invention relates to improvements in the production of phenolic resins.

Phenolic resins, as, for example, the material known under the trade name of "Bakelite" have been produced by condensing phenol or substituted phenols with formaldehyde or other aldehydes. The condensation is generally effected in an acid reaction.

One object of this invention is the production of phenolic resins in a considerably simpler manner, which allows the use of a single starting material. This, and still further objects, will become apparent from the following description:

In accordance with the invention, phenolic resins are produced by subjecting an organic hydroperoxide, which contains at least one aromatic radical, positioned at the same carbon atom as the hydroperoxy group to a cleavage and condensation. The organic hydroperoxides used as the starting material always contain a hydrocarbon radical which is linked to a hydroperoxy group (OOH group). The methods for the production of hydroperoxides of this kind are known and have often been described in the literature (see, for example, A. Rieche, "Alkylperoxyde und Ozonide," Dresden, 1931).

Hydroperoxides can be recovered, for example, by reacting alkyl sulfates with hydrogen peroxide. Many hydroperoxides may also be produced in a relatively simple and economical manner directly from suitable reactive hydrocarbons by the action of elementary oxygen. For this purpose, a hydrocarbon which, for example, is in the liquid form, is intimately mixed in known manner with oxygen at 80–100° C. and for a longer period of time. The absorption of oxygen thereby occurring may be accelerated by irradiation or by means of catalysts. The hydroperoxide formed may be recovered from the reaction mixture obtained by means of, for example, fractional distillation which is preferably effected under vacuum. In this manner, many hydroperoxides which are suitable for the process of the invention may be produced from the corresponding hydrocarbons, such as toluene hydroperoxide, $C_6H_5.CH_2.OOH$, ethyl benzene hydroperoxide, $C_6H_5.CH(CH_3).OOH$, propyl benzene hydroperoxide, $C_6H_5.CH(C_2H_5).OOH$, p-xylene hydroperoxide, $CH_3.C_6H_4.CH_2.OOH$. These are primary hydroperoxides (toluene hydroperoxides, p-xylene hydroperoxides) or secondary hydroperoxides (ethyl benzene hydroperoxides), all of which contain an aromatic radical (phenyl group) positioned at the same carbon atom as the OOH group.

The cleavage and condensation may be effected in an acid reaction. After the cleavage, the subsequent condensation may also be effected with the addition of alkaline materials. Prior to or after the hydroperoxide cleavage phenol and/or aldehydes from another source may be added. Examples of materials which are suitable for this purpose are phenol, o-cresol, m-cresol or p-cresol or xylenols. Examples of suitable aldehydes are formaldehyde, acetaldehyde, propionic aldehyde, or unsaturated aldehydes such as acroleine or crotonic aldehyde.

The most substantial advantage of the process in accordance with the invention resides in the fact that only one starting material is required for the production of the resin. Suitable starting materials generally include organic hydroperoxides which contain at least one aromatic radical, such as the phenyl radical. The aromatic radical must be positioned together with the hydroperoxy group at the same carbon atom of an aliphatic chain.

Primary and secondary organic hydroperoxides are preferably used as the starting materials in accordance with the invention. In the most simple case these may, for example, include toluene hydroperoxide ($C_6H_5.CH_2OOH$) and ethyl benzene hydroperoxide

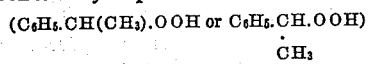

Peroxides of this type are known and may easily be obtained by the autooxidation of corresponding hydrocarbons, such as toluene or ethyl benzene.

In accordance with the invention, it is possible to directly obtain phenolic resins from hydroperoxides of this type by the action of acids such as sulfuric acid, or by the addition of other catalytically acting materials. The formation of the resins requires a certain elevated temperature, which, for example, may range about 80° C. and can easily be determined for the particular starting material to be processed.

The process of the invention may be effected in various manners. The condensation of the intermediately forming cleavage products to produce the resins may be effected in an acid reaction as well as in an alkaline reaction. If the condensation is to be carried out in an alkaline reaction, the hydroperoxide is first treated with the acid at somewhat reduced temperature. Following this, the reaction mixture is made alkaline by the addition of excess ammonia and other compounds, and thereafter the condensation to produce the phenolic resin is effected at an elevated temperature.

Mineral acids, preferably sulfuric acid or phosphoric acid, and also other strong acids such as sulfonic acids, formic acid or trichloroacetic acid are suitable for both, the peroxide cleavage and the subsequent condensation (production of the synthetic resin). If the cleavage and condensation are to be combined, a condensation temperature of about 80° C. and higher will be used. In this case, the hydroperoxide is added by drops to the hot acid having a concentration of about 50%, while stirring. The hydrogen ion concentration in this step generally ranges below pH=1.

If the cleavage and condensation are to be effected separately, then temperatures of only about 40° C. will be used. Moreover, the concentration of the acid is reduced to about 25–35% in this case. In an alkaline condensation the acid used for the cleavage is neutralized in this case, for example, with ammonia or caustic soda solution. Moreover, excess alkali is added and the condensation is effected in the known manner by heating to 100° C.

If the cleavage in accordance with the invention of the hydroperoxides is to be effected catalytically, this may with particular advantage be done with thionyl chloride ($SOCl_2$), from which as little as about 3% based on the hydroperoxide is sufficient. Heating is not required. The heat evolving in the decomposition of the hydroperoxides increases the reaction temperature within a few minutes to about 100° C. p-toluene sulfochloride may also be used to effect the cleavage catalytically. It is sufficient to add as little as about 0.3% of this compound. Following to the catalytic cleavage of the hydroperoxides, which proceeds very rapidly within a few minutes, the condensation is effected with the addition of stronger acids or alkali and proceeds similar to that of phenol and aldehydes to produce as such known synthetic resins.

The following examples are given by way of illustration and not limitation:

Example 1

Ethyl benzene hydroperoxide in amount of 20 grams was added by drops over a period of thirty minutes to about 30 cc. of 50% sulfuric acid while mechanically stirring. The temperature during the addition was maintained at about 80° C. Thereafter, the stirring was continued for about 45 minutes. When allowed to cool, the reaction mixture solidified, forming a solid resin.

Example 2

20 gms. p-xylene hydroperoxide were stirred with 0.6 gm. (3%) of thionyl chloride for 5 minutes at normal room temperature. Hereafter, the decomposition of the hydroperoxide was terminated and the temperature had increased to 100° C. Now 20 cc. of 10% ammonia water were added and the mixture was heated for 30 minutes at 100–120° C. in a closed vessel. After cooling, a solid light-colored synthetic resin was obtained as the finished product.

I claim:
1. Process for the production of phenolic resins which comprises heating ethyl benzene hydroperoxide with sulfuric acid to a temperature of about 80° C. while stirring, allowing the reaction mixture to cool, thus forming a solidified resin.

2. Process for the production of phenolic resins which comprises admixing p-xylene hydroperoxide with thionyl chloride at about normal temperature, heating the mixture to a temperature of about 100° C., adding an aqueous ammonia solution and continuing heating at a temperature between about 100 and 120° C., thereafter allowing the reaction mixture to cool, thereby forming a solid synthetic resin.

References Cited in the file of this patent

Savinova et al.: C. A., vol. 42 (1948), page 6768.
Kharasch et al.: (II), "Journal of Organic Chemistry," vol. 15, 1950, page 749.
Robitschek et al.: "Phenolic Resins," Iliffe and Sons, Ltd., London (1950), pages 77–79.
Kharasch et al.: (I), "Journal of Organic Chemistry," vol. 16, 1951, pages 150–160. (Copy in Sci. Lib.)